Feb. 13, 1923.

E. KEFERSTEIN

SPRING BUTTON OR PRESSURE FASTENER

Filed Sept. 1, 1921

1,445,618

Elisabeth Keferstein.

Patented Feb. 13, 1923.

1,445,618

UNITED STATES PATENT OFFICE.

ELISABETH KEFERSTEIN, OF BLASEWITZ, NEAR DRESDEN, GERMANY.

SPRING BUTTON OR PRESSURE FASTENER.

Application filed September 1, 1921. Serial No. 497,803.

*To all whom it may concern:*

Be it known that I, ELISABETH KEFERSTEIN, a subject of the Republic of Prussia, German Republic, and resident of Blasewitz, near Dresden, have invented a new and useful Improvement in Spring Button or Pressure Fasteners, of which the following is a specification.

The present invention relates to a separable fastener for garments or dresses comprising a stud member and a socket member and commonly known as press or snap buttons provided with binding springs arranged within the plate of the socket member.

Fasteners of the kind mentioned before of circular or rhomboidal shape are known already.

The present invention has for its object a press or snap button in which a socket member closed on its periphery is provided and the stud member and the socket member are of considerable length in comparison with their width resulting in bodies of an extended or longish form.

The arrangement of the garment-fastener of this kind ensures the advantage that its dimensions in length are increased without in any way necessitating an increase of its dimensions in width. Another advantage of such a garment fastener can be seen in the fact that, in comparison with using several separate press or snap-buttons fastened to a garment one above another or aside of each other, said fastener is a very firm and practical one, in as much as it is capable to most uniformly resist any pull acting on the total length of the fastener in such a manner that pleats cannot be formed within the garment near the fastener, on the contrary it will constantly maintain its original smoothness.

Figure 1:
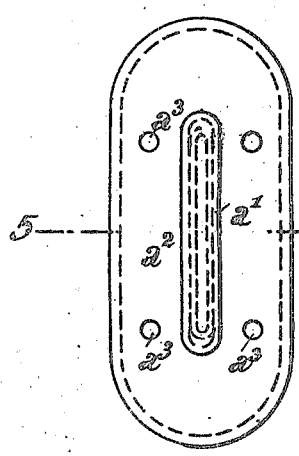
Figure 2:
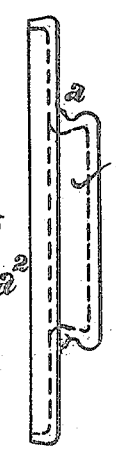
Figure 3:
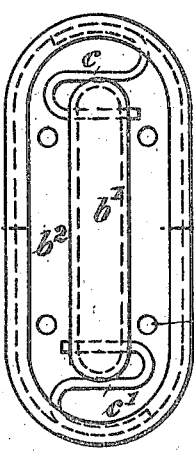
Figure 4:
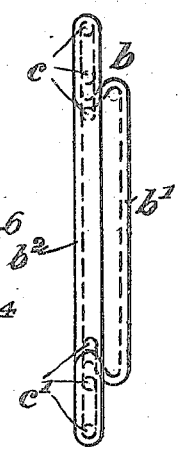
Figure 5:
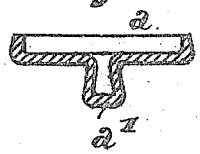
Figure 6:
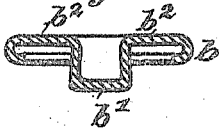
Figure 7:
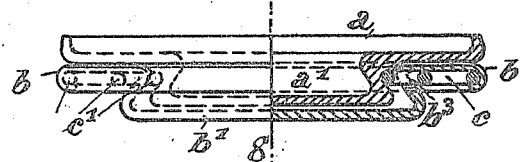
Figure 8:
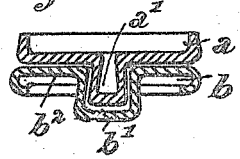

The accompanying sheet of drawings shows a fastener constructed in accordance with the invention. Fig. 1 represents a plan view and Fig. 2 a front plan view of the stud-member, Figs. 3 and 4 similar plan views of the socket member. Figs. 5 and 6 are sections according to line 5—5 of Fig. 1 and to line 6—6 of Fig. 3. Fig. 7 is partly a longitudinal elevation and partly a longitudinal section, showing said two members fastened or locked together and Fig. 8 a transverse-section according to line 8—8 of Fig. 7. Like letters of reference indicate corresponding parts in the several figures.

The stud or male member $a$ is provided with a straight and hollow ridge $a^1$ of considerable length in comparison with its width, the sides of said ridge being inclined.

The side portions $a^2$ of the stud or male member $a$ are pierced with holes $a^3$ for sewing on to the one part of the dress material.

In like manner the socket or female member $b$ is provided with a straight and hollow ridge $b^1$ of considerable length in comparison with its width, but of somewhat larger dimensions in length and width, so as to be capable of fully surrounding the ridge $a^1$ of the stud member $a$. The sides of the ridge $b^1$ are inclined too. $c\ c^1$ are binding springs inserted into the head edges of the bordered side portions $b^2$. The free extremities of said springs project through holes $b^3$ provided in the end portions of the ridge $b^1$ so that they may touch or meet the end portions of the ridge $a^1$ inserted into the socket-member $b$, as clearly seen in the righthand part of Fig. 7. The side portions $b^2$ are provided with holes $b^4$ for sewing to the other part of the garment.

In locking both members $a$ and $b$ together, the ridges $a^1$ and $b^1$ are situated one in another on their entire length greatly extended in comparison with their width and the inner ridge $a^1$ is fastened by the binding springs $c\ c^1$ projecting through the ridge $b^1$ and resting against the ridge $a^1$ as clearly seen from the righthand side of Fig. 7.

A garment-fastener arranged according to the present invention provides for a firm closure of garments and is highly resistant against any pull acting on it, so that the material of the garment remains fully smooth and without pleats.

I claim:

1. In a separable fastener in combination with a stud member, a socket member closed on its periphery and binding springs, a stud member ridge and a socket member ridge of considerable longitudinal dimensions in comparison with the width of said members resulting in bodies of an extended or longish form.

2. In a separable fastener an oblong stud member having a longitudinal ridge with undercut ends and of considerable length in comparison with its width and a similarly shaped socket member, the ridge in said socket member having openings in its ends, and a spring secured to the ends of the socket member and extending through said openings and engaging said undercut ends of the stud member to secure it in position.

In testimony, that I claim the foregoing as my invention, I have signed my name in presence of two witnesses, this 27th day of October, 1922.

ELISABETH KEFERSTEIN.

Witnesses:
 MAGDA FUOIRZINA,
 A. MELTY.